(12) United States Patent
Wang et al.

(10) Patent No.: US 10,162,959 B2
(45) Date of Patent: *Dec. 25, 2018

(54) METHOD AND APPARATUS FOR PROVIDING SUBSCRIBER IDENTITY MODULE-BASED DATA ENCRYPTION AND REMOTE MANAGEMENT OF PORTABLE STORAGE DEVICES

(71) Applicant: AT&T Intellectual Property I, L.P., Atlanta, GA (US)

(72) Inventors: Wei Wang, Weehawken, NJ (US); Mikhail Istomin, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,505

(22) Filed: May 8, 2017

(65) Prior Publication Data
US 2017/0245150 A1 Aug. 24, 2017

Related U.S. Application Data

(63) Continuation of application No. 14/635,531, filed on Mar. 2, 2015, now Pat. No. 9,646,148, which is a
(Continued)

(51) Int. Cl.
*G06F 21/44* (2013.01)
*H04W 12/06* (2009.01)
(Continued)

(52) U.S. Cl.
CPC .............. *G06F 21/44* (2013.01); *G06F 21/32* (2013.01); *G06F 21/79* (2013.01);
(Continued)

(58) Field of Classification Search
CPC ..... H04W 12/08; H04W 12/06; H04W 88/02; H04W 52/0261; H04L 63/0876;
(Continued)

(56) References Cited

U.S. PATENT DOCUMENTS 7,870,397 B2 * 1/2011 Lee .................. G06F 21/10
380/270
8,428,570 B2 * 4/2013 De Atley .............. H04W 8/265
379/161
(Continued)

*Primary Examiner* — Matthew Smithers

(57) ABSTRACT

Portable storage devices and methods for remotely managing such portable storage devices are disclosed. For example, a method receives a request from an endpoint device to send a command to a portable storage device. The method then authenticates the endpoint device that has sent the request. The method then transmits the command wirelessly to the portable storage device. Similarly, a portable storage device includes a processor and a computer-readable medium in communication with the processor, the computer-readable medium to store instructions. The instructions, when executed by the processor, cause the processor to perform operations that include: wirelessly receiving a command related to an access of a memory of the portable storage device, verifying an authenticity of the command and executing the command when the authenticity of the command is verified.

20 Claims, 7 Drawing Sheets

Related U.S. Application Data continuation of application No. 13/652,369, filed on Oct. 15, 2012, now Pat. No. 8,972,728.

(51) Int. Cl.

| | | |
|---|---|---|
| *G06F 21/32* | (2013.01) | |
| *G06F 21/79* | (2013.01) | |
| *H04W 12/08* | (2009.01) | |
| *H04L 29/06* | (2006.01) | |
| *H04W 52/02* | (2009.01) | |
| *H04W 88/02* | (2009.01) | |

(52) U.S. Cl.
CPC ........ *H04L 63/0876* (2013.01); *H04L 63/102* (2013.01); *H04W 12/06* (2013.01); *H04W 12/08* (2013.01); *H04W 52/0261* (2013.01); *H04W 88/02* (2013.01); *Y02D 70/00* (2018.01); *Y02D 70/1224* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/23* (2018.01)

(58) Field of Classification Search
CPC ....... H04L 63/102; G06F 21/44; G06F 21/32; G06F 21/79; Y02D 70/162; Y02D 70/144; Y02D 70/142; Y02D 70/1224; Y02D 70/166; Y02D 70/164; Y02D 70/23; Y02D 70/00
See application file for complete search history.

(56) References Cited

U.S. PATENT DOCUMENTS

| | | | |
|---|---|---|---|
| 8,972,728 B2 * | 3/2015 | Wang | G06F 21/32 713/168 |
| 9,646,148 B2 * | 5/2017 | Wang | G06F 21/44 |
| 2003/0083954 A1 | 5/2003 | Namba | |
| 2006/0128305 A1 | 6/2006 | Delalat | |
| 2006/0174349 A1 | 8/2006 | Cronce et al. | |
| 2007/0126562 A1 | 6/2007 | Ku | |
| 2007/0266440 A1 | 11/2007 | Kim | |
| 2009/0144810 A1 | 6/2009 | Gilboy | |
| 2010/0069039 A1 * | 3/2010 | Kawamura | G06K 19/07732 455/410 |
| 2010/0079337 A1 | 4/2010 | Shiau et al. | |
| 2010/0235575 A1 | 9/2010 | Yasaki et al. | |
| 2011/0022850 A1 | 1/2011 | Lee | |
| 2011/0047033 A1 * | 2/2011 | Mahaffey | G06Q 30/0269 705/14.66 |
| 2011/0088086 A1 * | 4/2011 | Swink | G06F 3/04883 726/7 |
| 2011/0090883 A1 | 4/2011 | Tanaka et al. | |
| 2011/0113242 A1 | 5/2011 | McCormack | |
| 2012/0238206 A1 * | 9/2012 | Singh | H04L 63/0492 455/41.1 |
| 2012/0309353 A1 * | 12/2012 | Markov | H04W 8/183 455/411 |
| 2012/0324067 A1 | 12/2012 | Hari | |
| 2013/0151658 A1 | 6/2013 | Baker et al. | |
| 2013/0265167 A1 | 10/2013 | Tilly et al. | |
| 2014/0057597 A1 * | 2/2014 | Velusamy | H04W 12/08 455/411 |
| 2015/0350411 A1 * | 12/2015 | Blom | H04W 12/06 455/411 |

* cited by examiner

METHOD AND APPARATUS FOR PROVIDING SUBSCRIBER IDENTITY MODULE-BASED DATA ENCRYPTION AND REMOTE MANAGEMENT OF PORTABLE STORAGE DEVICES

This application is a continuation of U.S. patent application Ser. No. 14/635,531, filed Mar. 2, 2015, now U.S. Pat. No. 9,646,148, which is a continuation of U.S. Ser. No. 13/652,369, filed Oct. 15, 2012, now U.S. Pat. No. 8,972,728, all of which are herein incorporated by reference in their entirety.

The present disclosure relates generally to portable storage devices and, more particularly, to providing data encryption and remote management of such devices.

BACKGROUND

Large-capacity portable storage devices, which may comprise "accessory" memory such as a zip drive, external hard drive, SIM card, micro SD card, flash memory or flash drive, USB Memory Stick, Multi-Media Card, etc., have become ubiquitous. Such portable storage devices, or external memory devices, have largely replaced floppy disks, such as the 3½ inch standard disk with a memory capacity that peaked at 1.44 MB. Typical USB memory sticks have storage capacities from 500 MB up to 16 GB or more. With such increased storage capacities comes the ability to store large amounts of potentially sensitive and private data in one portable and easily transferrable device. Such portable storage devices are often misplaced and easily stolen. In addition, large enterprises are vulnerable to employees leaving the premises with confidential and proprietary information, and it is often difficult to prevent such activities or to trace such activities after the fact.

SUMMARY

In one embodiment, the present disclosure discloses a method for remotely managing a portable storage device. For example, the method receives a request from an endpoint device to send a command to a portable storage device, authenticates the endpoint device that has sent the request, and transmits the command wirelessly to the portable storage device.

In another embodiment, the present disclosure discloses a portable storage device that includes a processor and a computer-readable medium in communication with the processor, the computer-readable medium to store instructions. The instructions, when executed by the processor, cause the processor to perform operations that include: wirelessly receiving a command related to an access of a memory of the portable storage device, verifying an authenticity of the command and executing the command when the authenticity of the command is verified.

In still another embodiment, the present disclosure discloses a portable storage device that includes a processor and a computer-readable medium in communication with the processor, the computer-readable medium to store instructions. The instructions, when executed by the processor, cause the processor to perform operations that include: detecting a usage of the portable storage device, gathering usage information relating to the portable storage device, and wirelessly transmitting the usage information that is gathered to a management server.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
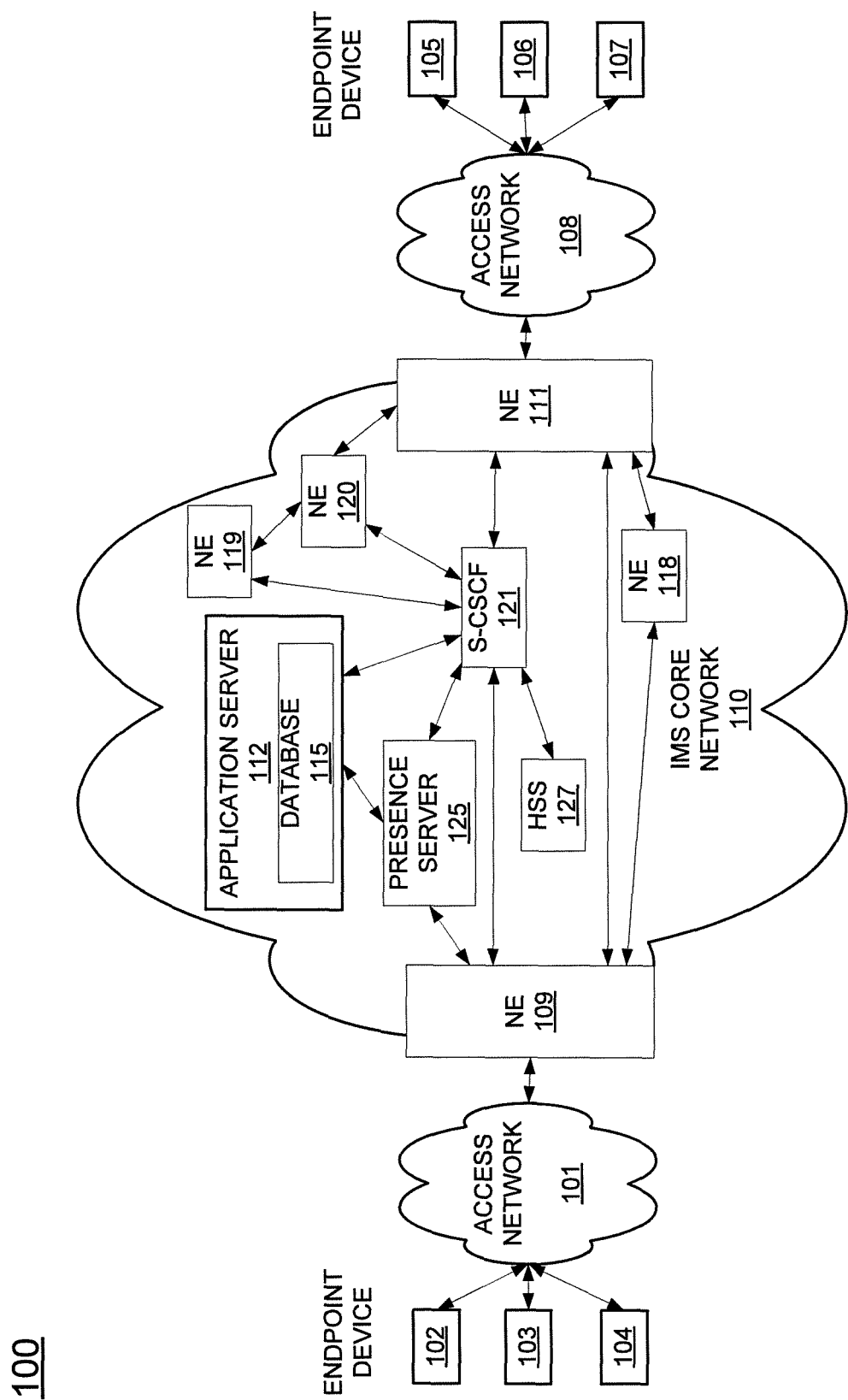
FIG. 1 illustrates an exemplary network related to the present disclosure.

The present disclosure broadly discloses portable storage devices that can be remotely managed and methods that can be used for managing such devices. Although the present disclosure may describe embodiments in the context of particular networks, systems and environments, the present disclosure is not so limited. Namely, the present disclosure can be applied to any type of computer-based communication network that is capable of supporting communications between devices. For instance, embodiments of the present disclosure may be deployed in, or provided by, an application server residing in a wireless network, a cellular network and/or a core network such as a packet network, e.g., an Internet Protocol (IP) based packet network, an enterprise server, a user's personal computer, a mobile phone, a smart phone, a cellular telephone, a computing tablet, a USB drive or memory stick, and various other communication devices.

Large-capacity portable storage devices as discussed above may have storage capacities from 500 MB up to 16 GB or more. With such increased storage capacities comes the ability to store large amounts of potentially sensitive and private data in one portable and easily transferrable device. Such portable storage devices are often misplaced and easily stolen. In addition, large enterprises are vulnerable to employees leaving the premises with confidential and proprietary information, and it is often difficult to prevent such activities or to trace such activities after the fact.

In contrast to the foregoing, embodiments of the present disclosure disclose novel portable storage devices for subscriber identity module-based data encryption and remote management which overcome the above limitations and provide further advantages. Embodiments of the present disclosure also disclose methods for remotely managing such portable storage devices, e.g., via a network-based application server. For example, one embodiment features a mobile network entity that acts as a certifying authority/key vault. In addition, embodiments of the present disclosure are operating system independent and do not require any special software on a workstation to support an interface to the portable storage device. It should be noted that although embodiments set forth herein describe portable storage devices having subscriber identity modules, the present disclosure is not so limited. Namely, other, further and different embodiments may implement one or more other components or devices providing the same or substantially similar functions to a subscriber identity module, in accordance with the present disclosure. For example, embodiments of the present disclosure may employ any integrated circuit or other device that may perform typical SIM card related functions (e.g., storage of an international mobile subscriber identity (IMSI) number, storage of an authentication key for authenticating the SIM to a mobile network, etc.) and that is at least capable of performing the functions mentioned herein which are described as being performed by a SIM card.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, personal digital assistants (PDAs), mobile/cellular phones, smart phones, private branch exchanges (PBXs), aggregate endpoints (e.g., an aggregate endpoint that employs a session initiation protocol (SIP) user agent to interact with the network on behalf of a plurality of endpoints aggregated behind it) and the like. In one embodiment of the present disclosure, one or more of the endpoint devices 102-107 comprises a portable storage device or "accessory" memory such as a zip drive, external hard drive, SIM card, micro SD card, flash memory or flash drive, USB Memory Stick, Multi-Media Card, etc. The access networks 101 and 108 serve to establish connections between the endpoint devices 102-107 and the network elements (NEs) 109 and 111 of the IMS core network 110. The access networks 101 and 108 may each comprise a digital subscriber line (DSL) network, a broadband cable access network, a local area network (LAN), a cellular or wireless access network, a third party network, and the like. In one particular embodiment, at least one of access networks 101 and 108 comprises a cellular/wireless access network. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a home subscriber server (HSS) 127, a serving-call session control function (S-CSCF) 121, a media server (MS) 125, and an application server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the session initiation protocol (SIP) over the underlying IMS based core backbone network 110. The S-CSCF 121 may be implemented to register users and to provide various services (e.g., VoIP services, cellular services and the like). The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers, in the case of a VoIP/voice call, other devices in the case of calls/messages terminating and/or originating in cellular access networks). For example, the S-CSCF may need to interact with another server for translation of an E.164 voice network address into a SIP uniform resource identifier (URI), and so on. For example, the S-CSCF routes to a proxy-call session control function (P-CSCF) indicated by the SIP URI. The P-CSCF then routes to the SIP user agent (UA) over a relationship that is established between the P-CSCF and the SIP UA which may represent an aggregate endpoint. This relationship could be a SIP trunk.

The presence server 125 is a dedicated server that tracks user presence data and user preferences. For example, the presence server 125 is capable of tracking a large number of presence parameters associated with a user or a particular user account, such as: internet protocol address(es) of user device(s), current cell tower, base station or wireless access point, instant messaging service status, social networking status, device state(s), such as on, off, standby, sleeping, etc., recent call/messaging usage information, global positioning satellite (GPS) location information, device speed information, availability information (e.g., based upon calendar, instant messaging status, or the like), current device identifier information (e.g., where a user has multiple devices registered in the same user account and/or where the user subscribes to a follow-me service or the like), device access time information, and so on. In the context of the present disclosure a "call" is broadly considered to be any voice or data call (e.g., including short message service (SMS) messages) traversing the network, and includes calls originating and/or terminating in cellular access networks. These call features are processed and stored by the presence server 125 for use by application server 112 or other components of the IMS core network 110.

In one embodiment, the network elements that are involved in supporting calls, messages and registrations of the network elements will provide presence information to the presence server 125. For example, a user may own endpoint device 102, which may comprise a cellular telephone, and may also own endpoint device 105, which may comprise a laptop computer. As such, access network 101 may comprise a cellular network and access network 108 may comprise a cable provider network providing internet access to the user's home. Consider where the S-CSCF 121 may register endpoint device 102 with the core IMS network 110. Since the endpoint device 102 (i.e., the cellular telephone) is currently registered with the S-CSCF 121, the S-CSCF 121 therefore knows that the user is currently present on his cellular phone (endpoint device 102) and is accessible via access network 101. Accordingly, this presence information may be passed by the S-CSCF 121 to presence server 125. In the same manner, any and all network elements, including devices/network elements in the access networks, may generate presence information of a user and/or device in association with a particular call, message or registration. For example, a base station in a cellular access network (e.g., access network 101) may indicate that endpoint devices 102, 103, and 104 are currently serviced by the base station. As such, presence information indicating that the endpoint devices are serviced by this particular base station may be passed to presence server 125. This particular type of presence information indicates both an approximate geographic location of a user as well as the user's presence on the cellular network via the user's cellular endpoint device (as opposed to the user being present on a home or work computer, a wireless access network, VoIP phone, etc.). In the context of the present disclosure, the presence server 125 may collect such presence information from any and all such network elements, or selected network elements involved in network 100. In one embodiment, the presence server 125 polls network devices to obtain user presence information. In another embodiment, various network elements automatically send presence information to the presence server 125 (e.g., according to a scheduled, at the end of each call/message/session, etc.).

The application server (AS) 112 may comprise any server or computer that is well known in the art, and the database 115 may be any type of electronic collection of data that is also well known in the art. In one embodiment, application server 112 comprises a short message service center (SMSC) or is contained with a short message service center. Thus, in one embodiment various functions described herein for providing messaging for remote management of portable storage devices may implement SMS messaging between devices. As such, the application server 112 may provide typical SMSC functions (described in greater detail below in connection with FIG. 2 and SMSC 265) in addition to the functions of the present disclosure described herein. In particular, AS 112 may perform any one or more operations described below in connection with the method 300 of FIG. 3.

The above IP network is only described to provide an illustrative environment in which packets for voice, data and/or multimedia services are transmitted on networks. Thus, those skilled in the art will realize that the communication system 100 may be expanded by including additional endpoint devices, access networks, network elements, application servers, etc. without altering the scope of the present disclosure.

Figure 2:
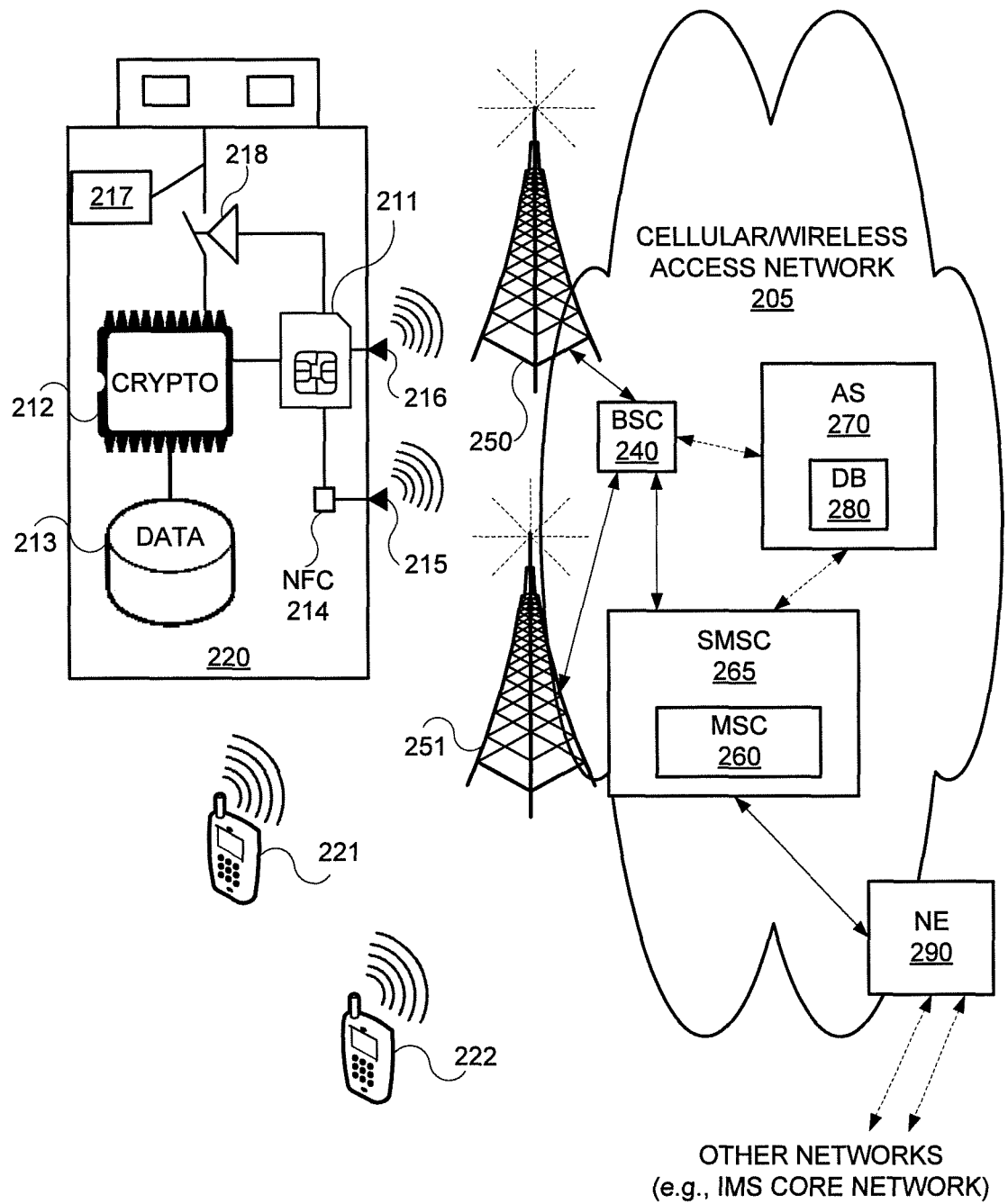
FIG. 2 illustrates an exemplary wireless access network related to the present disclosure.

FIG. 2 illustrates an exemplary access network 200 suitable for implementing embodiments of the present disclosure for providing data encryption and remote management of storage devices. In one embodiment, the access network 200 comprises a wireless access network 205 (e.g., a cellular access network). Access networks 101 and/or 108 depicted in FIG. 1 may comprise, for example, a wireless access network 205 as shown in FIG. 2. Wireless access network 205 is configured to support wireless communications to and from wireless endpoint devices 220-222. In one embodiment, one or more of wireless endpoint devices 220-222 comprises a portable storage device, e.g., an "accessory" memory such as a zip drive, external hard drive, SIM card, micro SD card, flash memory or flash drive, USB Memory Stick, Multi-Media Card, etc. For example, endpoint device 220 is illustrated as a portable storage device, e.g., a USB memory stick.

In one embodiment, the portable storage device includes a memory 213, a unit for storing a cryptographic key 212, a network firewall connection 214 and a subscriber identity module (SIM) card 211. The SIM card 211 communicates with the cellular network via an antenna 216 and communicates over a wireless local area network, a near-field communication network, or a peer-to-peer connection using antenna 215. In various embodiments, the unit for storing the cryptographic key 212 may comprise an application specific integrated circuit, a register, or similar hardware component, or may comprise a separate memory or a portion of memory 213 designated to store the cryptographic key. In one embodiment, data in the memory 213 is encrypted and can only be recovered using the cryptographic key, or the cryptographic key in conjunction with an additional access code that is not stored on the portable storage device. In one embodiment, a switch 218 is controlled by the SIM card such that in a default state, the SIM card allows no power or other external signals from an input/output port, e.g., a USB port, to reach the unit for storing the cryptographic key 212, the memory 213 and/or other components of the portable storage device. Thus, the connection to external input/output port(s) remains disabled even if the device is plugged into a workstation. Similarly, the switch 218 controlled by the SIM card may prevent a battery 217 from powering the unit for storing the cryptographic key 212, the memory 213 and/or other components until the switch is engaged by the SIM card 211. In other words, when the connections to available power sources are disabled, the device remains inert allowing no access to internal data stored in memory 213.

The links between wireless endpoint devices 220-222 and the wireless access network 205 comprises radio frequency (RF) signals between the one or more base stations 250-251 and the wireless endpoint devices 220-222. Here only two base stations 250 and 251 are depicted. However, it should be appreciated that the wireless access network 205 may comprise any number of base stations depending upon the size and needs of the wireless access network. In addition, although only three wireless endpoint devices 220-222 are depicted, it should be appreciated that any number of wireless endpoint devices may be serviced at the same time by the wireless access network 205.

Each of the base stations 250-251 comprises, at a minimum, a RF transceiver, and is configured to receive and transmit RF signals to and from wireless endpoint devices (e.g., wireless endpoint devices 220-222). As illustrated in FIG. 2, base stations 250-251 may support calls for a plurality of wireless endpoint devices 220-222 in a particular cell or cell sector of the base station. To manage the communications of the multiple wireless endpoint devices serviced by the wireless access network 205, the wireless access network 205 may comprise one or more network elements. For example, the wireless access network 205 may comprise one or more base station controllers (BSCs) and/or Radio Network Controllers (RNCs) for managing RF communication of the base stations 250-251. Although only one BSC/RNC 240 is depicted in FIG. 2 it should be understood that any number of BCSs/RNCs can be deployed. For example, each base station 250-251 could be serviced by its own BSC/RNC, or multiple base stations can be served by a BSC/RNC. BSC/RNC 240 performs a variety of wireless network management related tasks such as wireless channel assignments, determining transmission power levels, and controlling handovers from one base station to another base station, and the like. It should be noted that some of the functionalities of BSC/RNC could be implemented in the base stations 250-251. Similarly, some of the functionalities of BSC/RNC could be implemented in the MSC 260.

In one embodiment, wireless access network 205 includes at least one mobile switching center (MSC) 260. Among other functions, the MSC 260 may maintain user profile records for users/devices currently serviced by the base stations within the portion of the wireless access network that is the responsibility of MSC 260. For example, the MSC provides the information that is needed to support mobile service subscribers and/or devices, such as user/device registration and authentication information. The MSC may also function as a media gateway and/or media gateway controller facilitating communication between the wireless access network 205 and other networks. For example, in a typical circuit-switched wireless communication system, the MSC may connect the landline circuit switched network (e.g., a public switched telephone network (PSTN) system), or an IMS network, to the wireless communication system. Thus, the MSC 260 may be responsible for connecting calls between wireless endpoint devices 220-222 and one or more components in a core network (e.g., application server 112 or presence server 125 in IMS core network 110 of FIG. 1), or between wireless endpoint devices 220-222 and other wireless endpoint devices on the same access network or on other networks such as a session initiation protocol (SIP) based internet protocol multimedia subsystem (IMS) core network, a landline circuit switched network (e.g., a public switched telephone network (PSTN)), VoIP networks, asynchronous transfer mode (ATM) or frame relay networks, etc., via a network element 290.

In one embodiment, the wireless access network 205 includes a short message service center (SMSC) 265. The SMSC is responsible for receiving SMS messages from and forwarding SMS messages to the wireless/mobile endpoint devices 220-222. The SMSC 265 transmits SMS messages to other networks, when a SMS message originates from one of the wireless endpoint devices 220-222, and forwards SMS messages to the wireless endpoint device 220-222, when a SMS message is sent from elsewhere to one of the wireless endpoint devices 220-222. If one of the wireless endpoint devices 220-222 is unavailable to receive a message, the SMSC 265 will store the SMS message until the particular wireless endpoint device becomes available. Although the MSC 260 may perform numerous functions that are unrelated to SMS messages, in one embodiment the MSC 260 is a component of the SMSC 265. Thus, as illustrated in FIG. 2, MSC 260 forms part of SMS 265. However, it should be understood that the present disclosure is not so limited. Namely, in other embodiments, the MSC 260 and SMSC 265 may be separate components. In addition, the SMSC 265 may provide various reports to the sender and or recipient with respect to the submission, status and delivery of a SMS message.

It should also be noted that aspects of such reports may be reflected in features in one or more call detail records (CDRs) generated by the SMSC 265, and other components, in connection with a particular message or call. In one embodiment, the SMSC 265 is configured to forward SMS messages in a manner that is compatible with other networks. For example, the SMSC 265 may be a session initiation protocol (SIP) capable device and may therefore encapsulate a SMS message in a SIP protocol message in order to convey the SMS message through an IP network (e.g., an IMS core network) for onward transmission to a recipient device. For instance, the SMSC 265 may forward a SIP encapsulated SMS message externally from the cellular/wireless access network 205 via network element 290 (e.g., to a S-CSCF, application server or other device in a core IMS network). In this regard, it should also be noted that the sender and/or recipient of a SMS message may comprise a device, as opposed to a person, such as subscriber/user of the cellular network. For example, the sender may comprise a management server, such as a network-based application server, and the recipient may comprise endpoint device 220 (e.g., a USB memory stick). As such, various communications between a management server, portable storage devices and/or user devices may comprise one or more SMS messages, or messages of a similar format.

In one embodiment, the wireless access network 205 may also include an application server 270. The application server 270 may be configured to provide one or more functions supporting calls via the wireless access network 205. For example, application server 270 may comprise any server or computer that is well known in the art, and the database 280 may be any type of electronic collection of data that is also well known in the art. In one embodiment application server 270 may comprise a management server that performs one or more of the operations described below in connection with the method 300 of FIG. 3. In one embodiment, the application server 270 includes a database 280 suitable for collecting and storing call detail records (CDRs) (e.g., with respect to CDRs generated by network elements of the wireless access network 205, such as SMSC 265) as well as various parameters with respect to one or more of the endpoint devices 220-222 and/or the users of such devices. For example, application server 270 may collect and record connectivity, signal strength, location information or other parameters with respect to one or more of the endpoint devices 220-222. In one embodiment, the application server 270 may also forward outside the wireless access network 205 the information collected on one or more of the endpoint device 220-222. In other embodiments, complementary or additional information relating to various endpoint devices and/or the users of such devices may be stored in base station 250, BSC/RNC 240 or MSC 260, or a combination thereof.

Although the network elements deployed within the wireless access network 205 have been described as one or more discrete devices, it should be appreciated that the functionality described with respect to each network element is not limited to the particular device as described and depicted herein. Rather, the embodiment of FIG. 2 is merely illustrative of one wireless access network configuration that is suitable for implementing embodiments of the present disclosure. Thus, any other network elements providing the same functionality described herein with respect to the wireless access network 205 would be equally suitable for use in accordance with embodiments of the present disclosure. Those skilled in the art will realize that the wireless access network 205 may be expanded by including additional endpoint devices, base stations, BSCs, MSCs, service general packet radio service (GPRS) support nodes (SGSNs), gateway GPRS support nodes (GGSNs), network elements, application servers, etc. without altering the scope of the present disclosure. In addition, it should be noted that although certain components have been depicted and described in connection with wireless access network 205, in some embodiments, such components may be interconnected in a different manner or may even reside in different networks. For example, SMSC 265 may be located in an IMS core network (e.g., IP core network 110 in FIG. 1) rather than in an access network, or may even be hosted by a third-party (e.g., not in the wireless access network 205 and not in a core communication network). In one specific example, application server 112 of FIG. 1 may comprise a SMSC, or alternatively may be a component within a SMSC for executing various functions of the present disclosure. As another example, wireless access network 205 may comprise an IEEE 802.11 network, or a Wi-Fi network. For instance, base stations 250 and 251 may comprise wireless access points that communicate with endpoint devices 220-222 according to the IEEE 802.11 standard, and may also provide connectivity to other network, such as an IMS core network.

Figure 3:
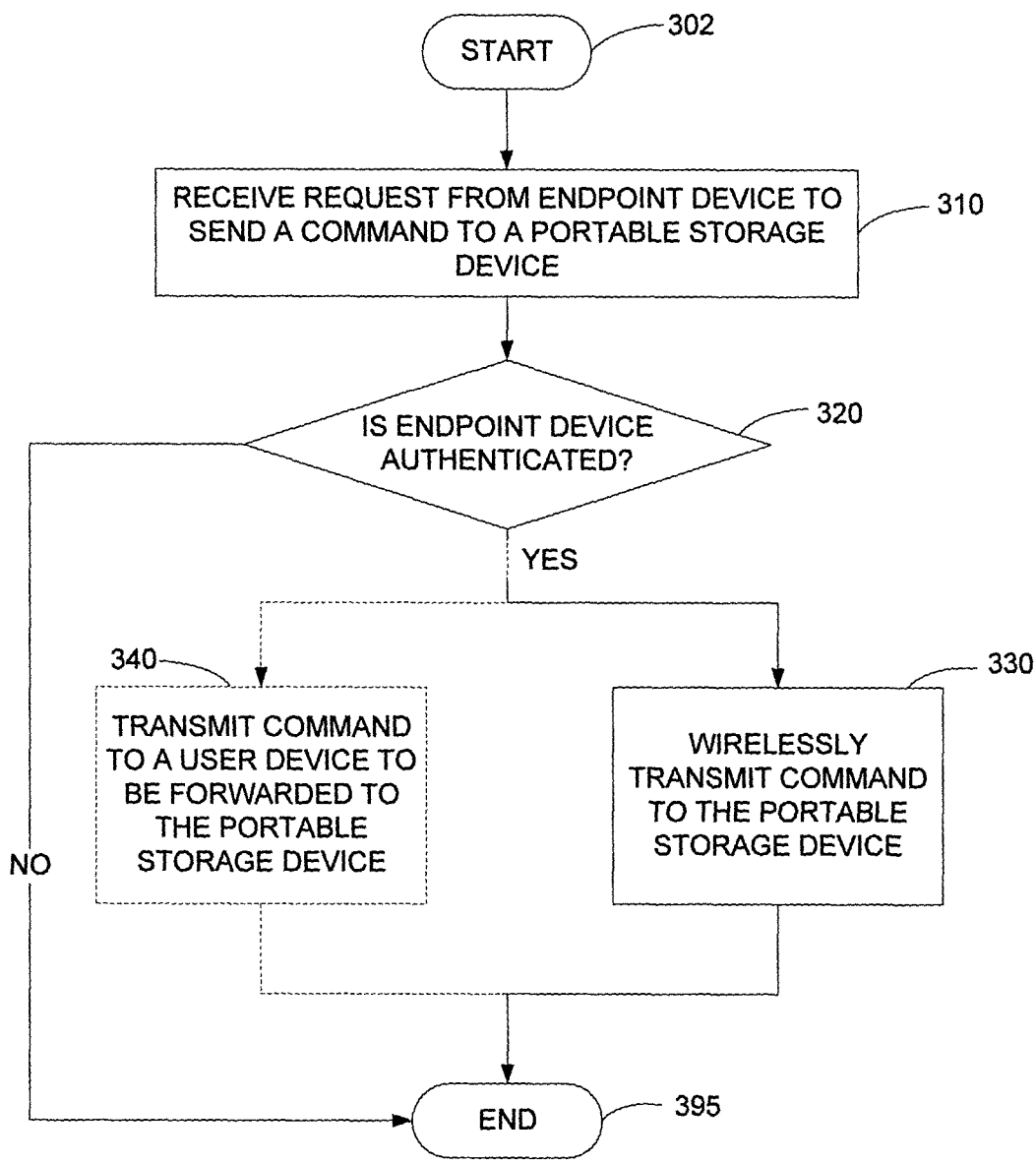
FIG. 3 illustrates a flowchart of a method for remotely managing a portable storage device according to the present disclosure.

FIG. 3 illustrates a flowchart of a method 300 for remotely managing a portable storage device. In one embodiment, one or more steps, operations or functions of the method 300 are performed by one or more of the components of the core network 110 and/or access networks 101, 108 or 200. For example, in one embodiment one or more steps of the method 300 can be implemented by a management server, e.g., AS 112 in FIG. 1 or AS 270 of FIG. 2. In another embodiment, method 300 may be performed by a management server similar to AS 112 that resides at a location that is outside the core network and/or mobile network infrastructure, but is still connected thereto. For instance, such a management server may reside at an enterprise location (e.g., a corporate office), or even on a user's home personal computer, so long as it has connectivity via the Internet. Alternatively, or in addition, one or more steps/operations/functions of the method 300 may be implemented by a general purpose computer having a hardware processor, a memory and input/output devices as illustrated below in FIG. 7.

The method 300 begins in step 302 and proceeds to step 310. At step 310, the method 300 receives a request from an endpoint device to send a command to a portable storage device. For example, a user via a personal computer, a laptop computer, a cellular phone, a smart phone, a computing tablet or any other devices may send a request to a management server for transmitting a command to the portable storage device. In one embodiment, the request may comprise a request to unlock or to lock the portable storage device. In another embodiment, the request may comprise a request to erase and/or destroy the memory of the portable storage device. In still another embodiment, the request may comprise a request for the portable storage device to record and/or to transmit one or more parameters pertaining to its status and usage.

At step 320, the method 300 authenticates the endpoint device and/or the user. For example, the method may confirm that it is receiving a request from an authorized user or endpoint device prior to transmitting the command to the portable storage device. For example, the method may require a user to provide a username and password, a public key, a token, one or more biometric authentications (e.g., a retina scan, a fingerprint and the like) or other security credential. In one embodiment, the method may look to an identifier of the endpoint device from which the request is received. For example, the method may look to the telephone number, IP address, media access control (MAC) address, unique device identifier (UDID), Session Initiation Protocol (SIP) address and/or other potential identifiers of the endpoint device. In one embodiment, the authentication requires both user information and endpoint device information. For example, the method may require authentication of both the endpoint device, e.g., via a UDID or other identifier, and the user, e.g., via a username and password combination, or the like. In this regard, it should be noted that as used herein, the term "authenticating an endpoint device" is intended to refer to an authentication of the endpoint device itself, authentication of a user of such an endpoint device as well as an authentication that involves information pertaining to both the endpoint device and the user. In addition, the method may consult a database (e.g., DB 115 in FIG. 1) with a list of authorized users and/or endpoint devices associated with each portable storage device. For example, a corporation may desire to manage a large number (e.g., 1,000) of portable storage devices for its employees. A manager may be designated as having authorization to interact with all of the devices, whereas an individual employee may only be designated as having authorization for a single portable storage device or a small number of portable storage devices. In addition, different users may not have full access to a portable storage device, but may only have access to a limited set of interactions with the portable storage device. For example, an individual employee may be authorized to request the locking and unlocking of his/her portable storage device, but may not be authorized to request the destruction or erasure of the device memory. In addition, different users may have different access priorities. For example, a command from the manager may lock the portable storage device even if a regular employee has unlocked the device and has not finished using it.

In one embodiment, the method may place restrictions on geographic locations, domains, and the like from which requests are received. For example, a security policy of the corporation may provide that employees may only request that a portable storage device be unlocked when the user is physically present within the geographic United States. Thus, if the employee is abroad, the method may prevent the user from accessing the portable storage device, even if the employee is normally permitted to unlock or otherwise interact with the portable storage device. In various embodiments, a management server may manage a single portable storage device, multiple portable storage devices (e.g., for an entire corporation) or even multiple families of portable storage devices (e.g., a network provider managing portable storage devices for numerous individual users and enterprise customers).

If the method 300 fails to authenticate the user and/or endpoint device at step 320, the method proceeds to step 395 where the method ends. On the other hand, if the authentication is successful, the method proceeds to step 330 and/or step 340.

At step 330, the method 300 transmits the requested command to the portable storage device. For instance, after successful authentication of the user/endpoint device at step 320 and after a request/command is received at step 310, the method 300 may send an appropriate signal to the portable storage device which causes the portable storage device to perform a specific action. For example, the method may transmit an unlock command, which causes the portable storage device to unlock a memory and render it readable, writeable and/or erasable. As another example, the method may transmit an erase and/or destroy command which causes the memory of the portable storage device to be erased (e.g., stored information to be cleared from the memory) and/or destroyed (e.g., causing the memory to be unusable, e.g., intentionally applying an electrical current that will damage the memory and the like). In another embodiment, the method may transmit a command to lock the device or for the device to begin recording one or more parameters relating to its usage. In one embodiment, the method 300 transmits the command to the portable storage device wirelessly. For instance, the method 300 may send the command via a cellular network connection. Accordingly, the portable storage device may receive the command at a subscriber identity module (SIM) card embedded in the portable storage device. In one embodiment, the command includes or is transmitted along with an access code or other security credential that will enable the portable storage device to verify that the command is legitimate. For example, the method may retrieve a particular access code that is specific to the portable storage device from a database (e.g., DB 115 in FIG. 1). In one embodiment, the access code is itself encrypted for transmission over potentially unsecured connections.

Alternatively, or in addition, following a successful authentication at step 320, the method may optionally proceed to step 340. At step 340, the method 300 transmits a command to a user device for later forwarding to the portable storage device. For example, the request may seek to have a command sent to a portable storage device that is not currently accessible over a cellular network connection or other network connection. As such, the method may send a command, along with an offline unlock permission, such as an access code, token and/or another similar type of security credential, for later presentation to the portable storage device. For example, the offline unlock permission may be sent to the authenticated endpoint device (i.e., the device on which the user was authenticated at step 320) or a different device, e.g., an authorized mobile device of the user. In one embodiment, the offline unlock permission comprises an access code that is time dependent and which expires after a predefined period of time. Notably, the device receiving the access code may provide the access code to the portable storage device at a later time via near-field communication (e.g., Wi-Fi, Bluetooth, ZigBee or similar method of wireless communication). As long as the access code has not expired, the access code will cause the portable storage device to unlock or allow an access to the portable storage device. In one embodiment, the time-dependent access code causes the portable storage device to remain unlocked for a predefined period of time and/or to remain unlocked until the portable storage device is disconnected from a reading device (e.g., disconnected from a USB port of a personal computer). In other words, the portable storage device may remain open/unlocked only for a predefined period of time or may lock immediately upon being disconnected from a device used to access the portable storage device, e.g., a personal computer. For instance, the unlocking of the portable storage device may be valid for only a single use at any one time. In one embodiment, the method 300 may perform steps 330 and 340 substantially simultaneously or in a sequence.

In any case, following steps 330 and/or step 340, the method 300 proceeds to step 395 where the method 300 ends.

Figure 4:
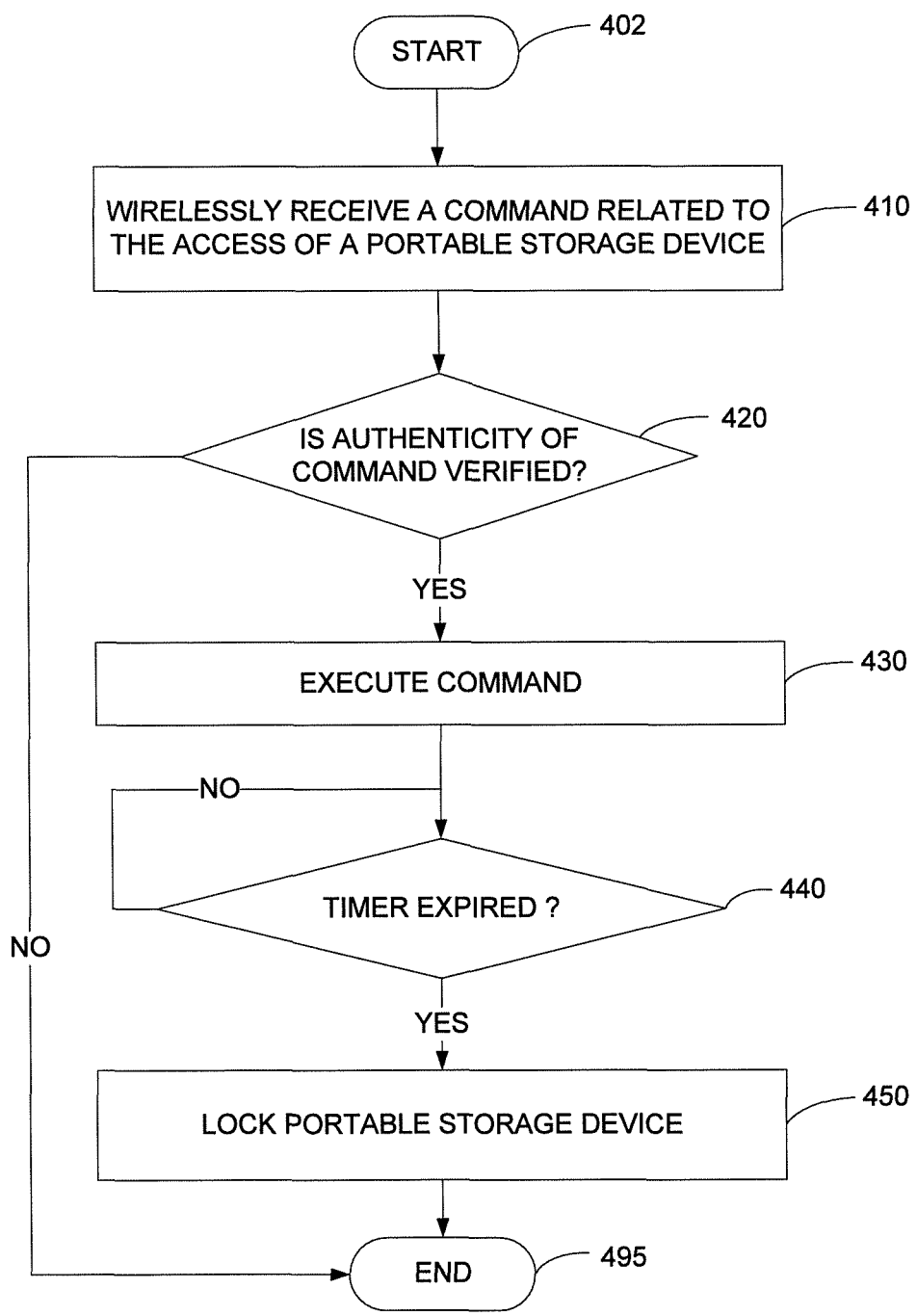
FIG. 4 illustrates a flowchart of another method for remotely managing a portable storage device according to the present disclosure.

FIG. 4 illustrates a flowchart of another method 400 for remotely managing a portable storage device. In various embodiments, the steps, operations or functions of the method 400 are performed by any one or more components of a portable storage device, such as portable storage device 220 in FIG. 2. Similarly, it should also be understood that one or more steps/operations/functions of the method 400 may be implemented by a general purpose computer having a processor, a memory and input/output devices as illustrated below in FIG. 7. For example, one or more components of a portable storage device executing the method 400 may take the form of the general purpose computer 700 in FIG. 7.

The method 400 begins in step 402 and proceeds to step 410. At step 410, the method 400 receives a command related to an access of the portable storage device. In one embodiment, the command is received wirelessly. For example, the method 400 may receive a command from a base station via a cellular network connection or via another wireless connection, such as Bluetooth or ZigBee. In one embodiment, the command is received from a management server. In another embodiment, the command is received from a user device, such as a user's mobile phone, a smart phone, a computing tablet or a personal computer. In one embodiment, the command may comprise an unlock command, an erase/destroy memory command, a lock command and/or a command to record one or more parameters relating to a usage of the portable storage device.

At step 420, the method 400 verifies the authenticity of the command. For example, the command may include or be transmitted along with an access code, public key identifier, a token or similar security credential for authenticating the source of the command. For instance, a cryptographic key on a portable storage device may keep the portable storage device in a locked state until a correct access code is received. The access code may comprise an encrypted complimentary key which, when combined with the cryptographic key stored on the portable storage device, comprises a complete access key for unlocking the portable stage device. For example, the access key may comprise a unique code to decrypt the data stored in a memory of the portable storage device. If a command is received with no access code or the incorrect access code, the method may proceed from step 420 to step 495 where the method ends. However, in one embodiment, the method may also transmit a message (e.g., to a management server via a cellular network connection) indicating that an unauthorized command was received and blocked by the portable storage device.

In one embodiment, a portable storage device remains locked and in an unpowered state by default. Only upon receiving a valid access code will the portable storage device allow its internal components, such as a unit for storing a cryptographic key and a memory, to be powered on. For example, a SIM card of the portable storage device may control a switch that regulates whether current from a power source (e.g., from an external source over an input/output connection, from an internal battery, etc.) is able to flow to other components of the portable storage device. Thus, in one embodiment, at step 420 the method 400 may unlock a memory, a unit for storing a cryptographic key, etc. and/or enable a power source to power such components.

If, the correct access code is determined at step 420, the method may proceed to step 430 where the method executes the received command. For example, if the command is to unlock the portable storage device, the method 400 may unlock a memory of the portable storage device such that it is readable, writeable and/or erasable. In one embodiment, the access code comprises a complimentary key, which, when combined with a cryptographic key stored on the portable storage device, comprises an access key for decrypting data stored in the memory (and for encrypting the data if and when the memory/portable storage device is subsequently relocked). Similarly, if the command is to erase/destroy the memory of the portable memory device, the method 400 may implement a process to carry out such action(s). For instance, the method 400 may trigger a mechanism to physically destroy the memory or may implement an overwrite algorithm that sufficiently purges the prior memory state(s).

In one embodiment, the portable storage device may have insufficient power to carry out the erase (and/or destroy) command. For example, the portable storage device may currently have no external power source available and may have a battery power level that is below a threshold deemed sufficient to complete the command. In such case, the method 400 may lock the portable storage device until it is plugged into a computer to charge to a power level sufficient to delete the data in the memory. In other words, the method 400 may later erase or destroy the memory when the portable storage device is connected to a power source, i.e., to carry out the received command at such time when it is able to do so.

At step 440, the method 400 determines whether an access timer has expired. In one embodiment, access to the portable storage device is limited to a particular time duration (e.g., one hour). In another embodiment, access is limited based upon the completion of a particular transaction. For instance, the access may be allowed until the portable storage device is disconnected from a USB drive/reader. In another example, an access to the device is allowed only for the duration to carry out the command received at step 410. For instance, if the command is an erase command, the device is accessible only for purposes of completing an execution of the command. In one embodiment, an access duration is limited by the portable storage device itself. In another embodiment, the access duration is specified in or along with the command and/or access code that is received. For example, the access duration may be set based upon a management policy that applies to one or more portable storage devices, or may be specified by the user when submitting the request to send a command to the portable storage device.

If the access timer expires, the method 400 proceeds to step 450 where the portable storage device is locked. At step 495, the method 400 ends.

Figure 5:
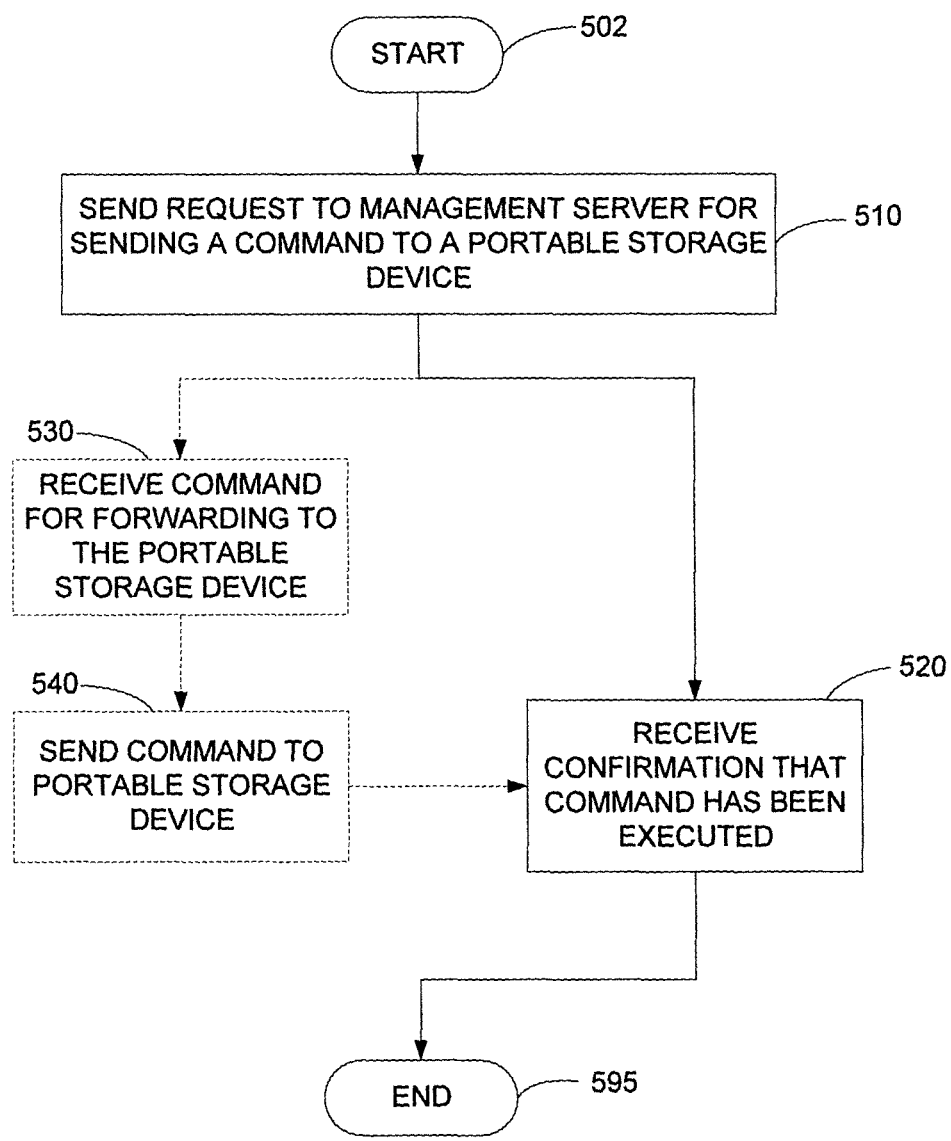
FIG. 5 illustrates a flowchart of another method for remotely managing a portable storage device according to the present disclosure.

FIG. 5 illustrates a flowchart of another method 500 for remotely managing a portable storage device. In various embodiments, the steps, operations or functions of the method 500 are performed by an endpoint device, such as one of endpoint devices 102-107 in FIG. 1. Similarly, it should also be understood that one or more steps/operations/functions of the method 500 may be implemented by a general purpose computer having a processor, a memory and input/output devices as illustrated below in FIG. 7.

The method 500 begins in step 502 and proceeds to step 510. At step 510, the method 500 sends a request to a management server for sending a command to a portable storage device. In one embodiment, the management server resides in a cellular network provider network or is connected to such a network. In one embodiment, the request may comprise a request to unlock a portable storage device, a request to erase or destroy a memory of the portable storage device, a request to lock the device, or a request to record one or more usage parameters pertaining to the device. In one embodiment, at step 510 the method 500 additionally sends user and/or endpoint device authentication credentials along with the request (e.g., a login and password, an access code, a public key identifier, a token, and the like).

Following step 510, the method 500 may optionally proceed to step 530 where the method receives a command to be forwarded to the portable storage device. For example, the management server may attempt to transmit a command to the portable storage device wirelessly, e.g., via a cellular network connection based on the received request. However, if the portable storage device is unreachable in this manner, the method 500 may receive from the management server the command along with a time-limited access code. In other words, instead of the management server forwarding the command directly to the storage portable storage device, the management server may instead provide the command along with a time-limited access code back to the user's device that originally made the request.

Accordingly, at step 540 the method 500 may provide the command and the access code to the portable storage device directly at a later time. For example, the portable storage device may be brought within sufficient range such that the method 500 may transmit the command and access code via near-field communication to the portable storage device, directly from another user device implementing method 500.

Following step 540, or directly following step 510, the method proceeds to step 520 where confirmation is received that the command has been executed. For example, if the command is a memory erase command, the portable storage device, upon completion of erasing its memory, may transmit a message to the management server that the erasure is complete. In one embodiment, the message is sent over a cellular network connection via a SIM card of the portable storage device. For example, a SMS message may be sent to the management server. In turn, the management server may provide a confirmation message to the method 500 that the task is complete. Following step 520, at step 595 the method 500 ends.

Figure 6:
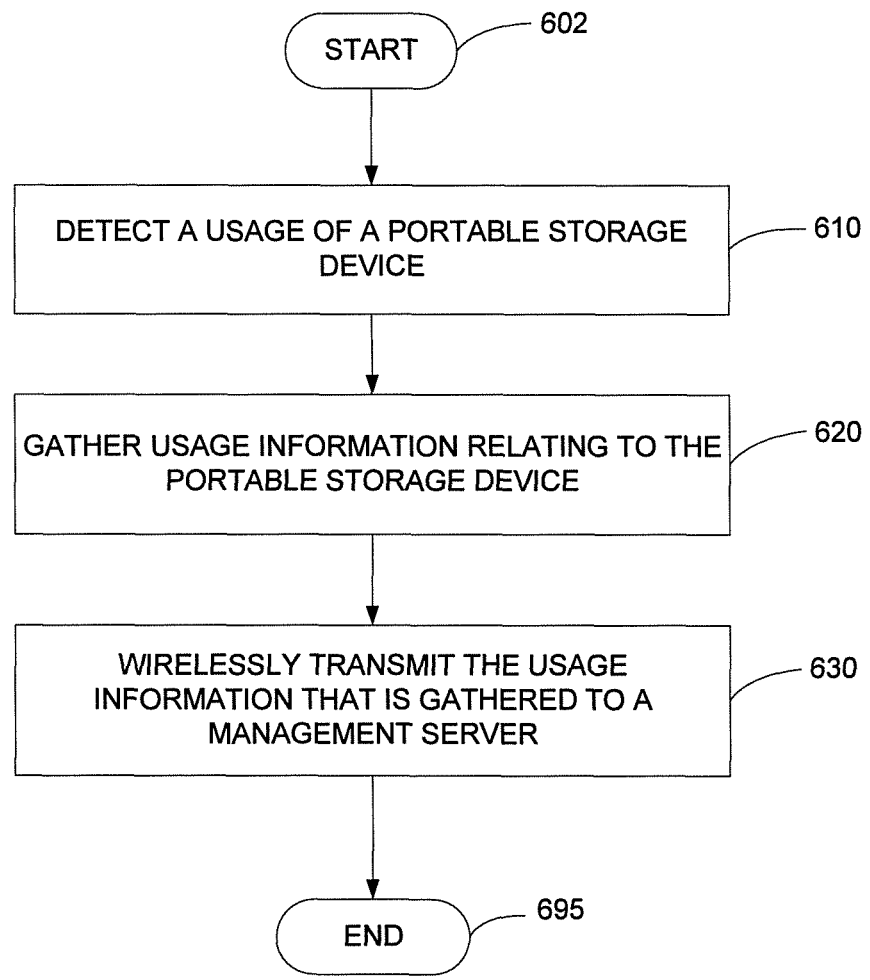
FIG. 6 illustrates a flowchart of still another method for remotely managing a portable storage device according to the present disclosure.

FIG. 6 illustrates a flowchart of still another method 600 for remotely managing a portable storage device. In various embodiments, the steps, operations or functions of the method 600 are performed by one or more components of a portable storage device, such as portable storage device 220 in FIG. 2. Similarly, it should also be understood that one or more steps/operations/functions of the method 600 may be implemented by a general purpose computer having a processor, a memory and input/output devices as illustrated below in FIG. 7. For example, one or more components of a portable storage device executing the method 600 may take the form of the general purpose computer 700 in FIG. 7.

The method 600 begins at step 602 and proceeds to step 610. At step 610, the method 600 detects a usage of the portable storage device. For example, the method 600 may detect that the portable storage device has been connected to a USB port or reader (e.g., where the portable storage device is a USB memory stick). For instance, the method 600 may detect an availability of a power signal via the USB port. In another embodiment, the method 600 may detect a usage of the portable storage device when an attempt is made to access the stored information on the portable storage device.

At step 620, the method 600 gathers usage information related to the portable storage device. For example, an unlock command and an access code may have been provided to an endpoint device as described above in connection with steps 340 and 530 of the exemplary methods 300 and 500. Accordingly, when the endpoint device attempts to access the portable storage device using the command and access code, the method 600 may record information pertaining to this access. In one embodiment, the access of the portable storage device may comprise unlocking a memory of the portable storage device and performing various operations pertaining to files stored thereon. For example, a user may access a document stored on the portable storage device, modify the document and save the changes to the document. Similarly, the user may access an application on the portable storage device, upload a new file, and so forth. As such, the method 600 may record the activities involved in the accessing of the portable storage device.

In addition, at step 620 the method 600 may record various other parameters relating to the usage of the portable storage device. For instance, various "presence parameters" may be obtained and recorded, such as: a time of access, an IP address and/or MAC address of a device to which the portable storage device is connected, a current geographic location of the storage device, a current battery power level of the portable storage device, a current signal strength for a connection between the portable storage device and a cellular base station, and so forth.

At step 630, the method 600 transmits the usage information to a management server. For example, in one embodiment the usage information is transmitted wirelessly from the portable storage device to a management server located within or connected to a cellular/mobile network via a SIM card embedded in the portable storage device. Notably, while a device to which the portable storage device is connected can potentially block access to external network (e.g., via its own network connection(s), the portable storage device may include its own SIM card for communicating directly with a cellular/mobile network. In one embodiment, the management server may access additional usage and presence information pertaining to the portable storage device from a presence server (e.g., presence server 125 in FIG. 1). Conversely, the management server may provide to the presence server usage information obtained from the portable storage device for storage.

In turn, the usage information may be made available to the owner of the portable storage device, a technology manager for a company owning the portable storage device, etc. For instance, a user who has lost a portable storage device or who has had the device stolen may obtain information as to where the portable storage device is located or other information that may help to identify who has taken the device. Similarly, a technology manager for a corporation may be informed of an access attempt on a portable storage device at a location off-campus, e.g., away from the corporate location or premises. If the corporation has a policy preventing the removal of such portable storage devices and potentially confidential information from the campus, the usage information may assist in determining who has the device. Further, the technology manager may then have the opportunity to request an upload of the stored information and then followed by a remote wipe command be sent to the portable storage device to cause the portable storage device to erase its data, to send a lock command to lock-down the device, etc. Following step 630, the method 600 proceeds to step 695 where the method ends.

It should be noted that although not specifically specified, one or more steps/functions/operations of each of the respective methods 300, 400, 500 and 600 may include a storing, displaying and/or outputting step as required for a particular application. In other words, any data, records, fields, and/or intermediate results discussed in each of the respective methods can be stored, displayed and/or outputted to another device as required for a particular application. Furthermore, steps or blocks in each of FIGS. 3-6 that recite a determining operation or involve a decision do not necessarily require that both branches of the determining operation be practiced. In other words, one of the branches of the determining operation can be deemed as an optional step.

Figure 7:
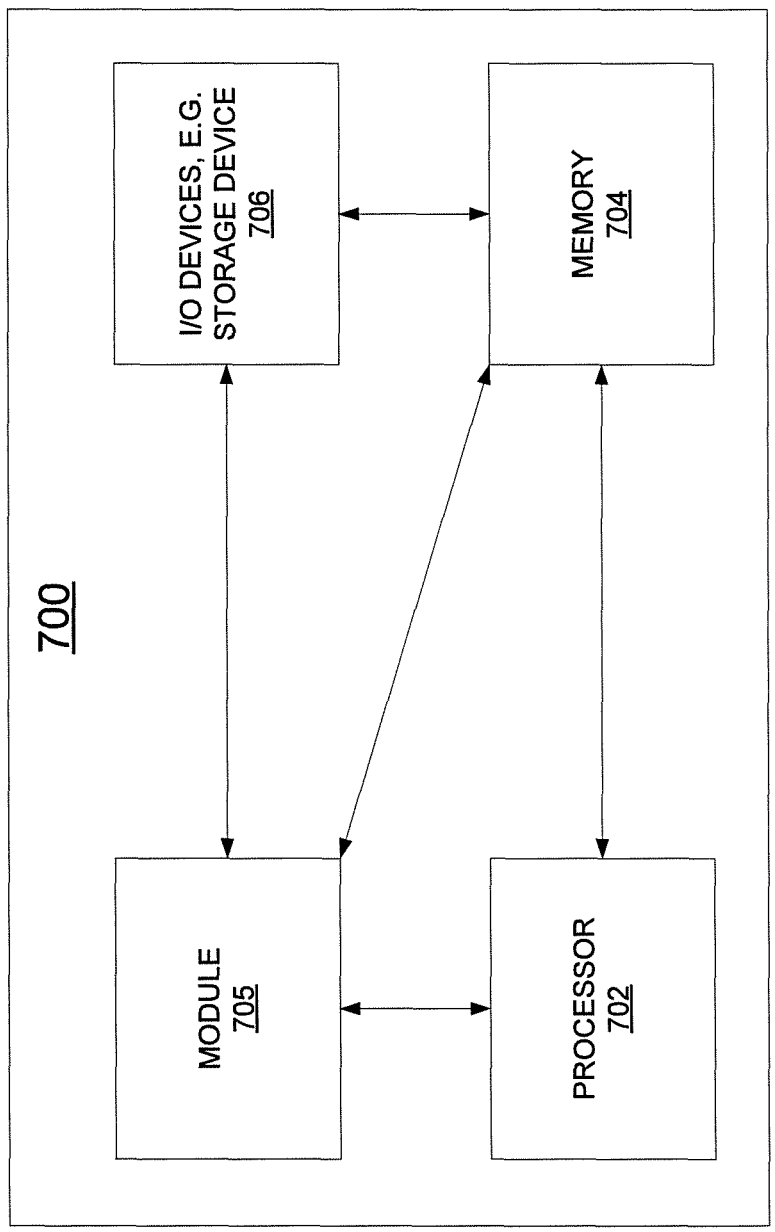
FIG. 7 illustrates a high-level block diagram of a general-purpose computer suitable for use in performing the functions described herein.

FIG. 7 depicts a high-level block diagram of a general-purpose computer suitable for use in performing the functions described herein. As depicted in FIG. 7, the system 700 comprises a hardware processor element 702 (e.g., a microprocessor, a central processing unit (CPU) and the like), a memory 704, e.g., random access memory (RAM) and/or read only memory (ROM), a module 705 for performing various functions as described herein, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). In one embodiment, module 705 may comprise computer/processor executable code containing a plurality of instructions for performing steps/operations/functions of the exemplary methods 300, 400, 500 and/or 600.

Accordingly, it should be noted that the present disclosure can be implemented in software and/or in a combination of software and hardware, e.g., using application specific integrated circuits (ASIC), a general purpose computer or any other hardware equivalents, e.g., computer readable instructions (e.g., a software program comprising computer-executable instructions) pertaining to the method(s) discussed above can be used to configure a hardware processor to perform the steps/functions/operations of the above disclosed methods. For example, in one embodiment, the module or process 705 can be loaded into memory 704 and executed by processor 702 to implement the operations as discussed above in connection with any one or more of the exemplary methods 300, 400, 500 and 600. As such, the present module or process 705 (including associated data structures) of the present disclosure can be stored on a non-transitory (e.g., tangible, physical or hardware) computer readable storage medium or device, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for remotely managing a portable storage device, the method comprising:
   receiving, by a processor, a request from an endpoint device to send a command to the portable storage device;
   authenticating, by the processor, the endpoint device that has sent the request; and
   transmitting, by the processor, the command to the portable storage device, wherein the command is transmitted wirelessly, wherein the command comprises an unlock command for unlocking the portable storage device, wherein the portable storage device is a subscriber identity module card.

2. The method of claim 1, wherein the unlock command comprises a command that causes the portable storage device to be unlocked for a predefined period of time.

3. The method of claim 1, wherein the unlock command comprises a command that causes the portable storage device to be unlocked until the portable storage device is disconnected from a device used to access a memory of the portable storage device.

4. The method of claim 1, wherein the command further comprises an erase command for erasing a memory of the portable storage device.

5. The method of claim 4, wherein the erase command comprises a command that causes the memory of the portable storage device to be destroyed.

6. The method of claim 4, wherein the erasing the memory is to be performed when the portable storage device is connected to a power source.

7. The method of claim 1, wherein the command is transmitted wirelessly to the portable storage device via a cellular network.

8. The method of claim 1, wherein the command is transmitted wirelessly to the portable storage device via a near-field communication.

9. The method of claim 8, wherein the transmitting the command to the portable storage device comprises sending the command and an access code to a user device for forwarding to the portable storage device via the near-field communication.

10. A portable storage device, comprising:
a processor; and
a computer-readable medium storing a plurality of instructions which, when executed by the processor, cause the processor to perform operations, the operations comprising;
receiving a command related to an access of a memory of the portable storage device, wherein the command is received wirelessly, wherein the command comprises an unlock command for unlocking the portable storage device, wherein the portable storage device is a subscriber identity module card;
verifying an authenticity of the command; and
executing the command when the authenticity of the command is verified.

11. The portable storage device of claim 10, wherein the operations further comprise:
activating a switch to allow a current to flow from a power source to a unit for storing a cryptographic key of the portable storage device when a valid authorization code is received along with the command.

12. The portable storage device of claim 11, wherein the operations further comprise:
decrypting data stored in the memory of the portable storage device using the cryptographic key.

13. The portable storage device of claim 11, wherein the power source comprises a battery of the portable storage device.

14. The portable storage device of claim 10, wherein the command further comprises an erase command for erasing the memory of the portable storage device.

15. The portable storage device of claim 14, wherein the erasing the memory is to be performed when the portable storage device is connected to a power source.

16. The portable storage device of claim 10, wherein the command is transmitted wirelessly to the portable storage device via a cellular network.

17. The portable storage device of claim 10, wherein the command is transmitted wirelessly to the portable storage device via a near-field communication.

18. The portable storage device of claim 17, wherein the transmitting the command to the portable storage device comprises sending the command and an access code to a user device for forwarding to the portable storage device via the near-field communication.

19. A portable storage device, comprising:
a processor; and
a computer-readable medium storing a plurality of instructions which, when executed by the processor, cause the processor to perform operations, the operations comprising;
detecting a usage of the portable storage device, wherein the portable storage device is a subscriber identity module card;
gathering usage information relating to the portable storage device, wherein the usage information comprises information related to a document that is accessed in the portable storage device; and
transmitting the usage information that is gathered to a management server, wherein the usage information is transmitted wirelessly.

20. The portable storage device of claim 19, wherein the usage information is transmitted wirelessly to the management server via a cellular network.

* * * * *